(12) United States Patent
Tagami

(10) Patent No.: US 12,530,554 B2
(45) Date of Patent: Jan. 20, 2026

(54) INFORMATION PROCESSING APPARATUS, METHOD, AND STORAGE MEDIUM

(71) Applicant: CANON KABUSHIKI KAISHA, Tokyo (JP)

(72) Inventor: Yasuyuki Tagami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 71 days.

(21) Appl. No.: 18/499,732

(22) Filed: Nov. 1, 2023

(65) Prior Publication Data

US 2024/0143961 A1    May 2, 2024

(30) Foreign Application Priority Data

Nov. 2, 2022  (JP) ................ 2022-176783

(51) Int. Cl.
*G06K 7/14*    (2006.01)
(52) U.S. Cl.
CPC ......... *G06K 7/1473* (2013.01); *G06K 7/1417* (2013.01)
(58) Field of Classification Search
CPC ........................ G06K 7/1417; G06K 7/1443
USPC .................................... 235/462.09
See application file for complete search history.

(56) References Cited

U.S. PATENT DOCUMENTS

| | | | |
|---|---|---|---|
| 8,584,950 B2* | 11/2013 | Endo | G06K 5/00 235/462.11 |
| 2009/0090782 A1* | 4/2009 | May | G06V 10/145 235/462.21 |
| 2013/0175340 A1* | 7/2013 | Endo | G06K 7/10821 235/437 |
| 2016/0117528 A1* | 4/2016 | Gelay | G06K 7/1095 |
| 2021/0142019 A1* | 5/2021 | Astvatsaturov | G06K 7/10881 |
| 2023/0281887 A1* | 9/2023 | Wesner | G06V 30/186 382/182 |

FOREIGN PATENT DOCUMENTS

JP    2021002220 A    1/2021

\* cited by examiner

*Primary Examiner* — Paultep Savusdiphol
(74) *Attorney, Agent, or Firm* — Canon U.S.A., Inc. IP Division

(57) ABSTRACT

An information processing apparatus including an acquisition unit that acquires two-dimensional code information included in an acquired image, a control unit that, in a case where the acquired information satisfies a predetermined condition, executes processing corresponding to the two-dimensional code, and a setting unit that, in a case where the acquired information does not satisfy the predetermined condition, sets a corresponding two-dimensional code as a non-processing target code.

13 Claims, 7 Drawing Sheets

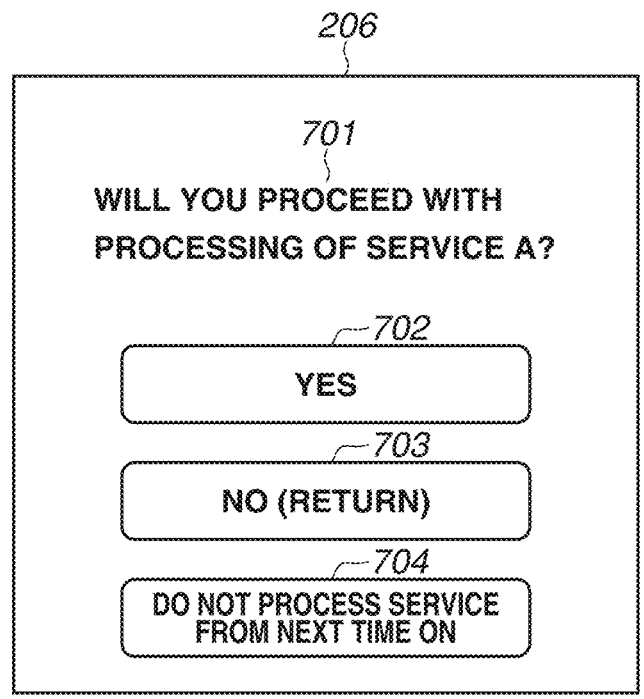

INFORMATION PROCESSING APPARATUS, METHOD, AND STORAGE MEDIUM

BACKGROUND

Field

The present disclosure relates to two-dimensional code processing.

Description of the Related Art

In recent years, there has been an increasing number of settlement services using two-dimensional codes. There are two different settlement methods using two-dimensional codes. In one method, a two-dimensional code presented by a shop is read by a user terminal. In the other method, a two-dimensional code presented by a user is read by a shop terminal. For the method in which a two-dimensional code presented by a shop is read by a user terminal, the increase in the use of settlement services has increased the number of shops where two-dimensional codes of a plurality of settlement services are presented together. In a case where the distance between a plurality of presented two-dimensional codes is close, the user terminal recognizes and processes a two-dimensional code unintended by the user.

Japanese Patent Application Laid-Open No. 2021-2220 discusses a method for displaying only a two-dimensional code corresponding to a settlement service to be used by a user from a plurality of two-dimensional codes on a display panel of a shop.

In the method discussed in Japanese Patent Application Laid-Open No. 2021-2220, the shop needs to install an applicable display apparatus, and the above-described issue remains unsolved in a shop not installing the relevant display apparatus. More specifically, a user terminal can read a two-dimensional code unintended by the user, possibly resulting in the execution of unintended processing.

SUMMARY

The present disclosure is directed to providing a method in which, even if a two-dimensional code unintended by the user is acquired, processing corresponding to the two-dimensional code can be suitably performed.

According to an aspect of the present disclosure, an information processing apparatus includes a memory storing instructions, and a processor that, upon execution of the stored instructions, is configured to operate as an acquisition unit configured to acquire two-dimensional code information included in an acquired image, a control unit configured to, in a case where the acquired information satisfies a predetermined condition, execute processing corresponding to the two-dimensional code, and a display control unit configured to, in a case where the acquired information does not satisfy the predetermined condition, display the corresponding two-dimensional code to enable a user to identify that the two-dimensional code is a non-processing target code.

Further features of the present disclosure will become apparent from the following description of exemplary embodiments with reference to the attached drawings.

BRIEF DESCRIPTION OF THE DRAWINGS

FIG. 7 illustrates an example of an operation screen for selecting whether to perform processing.

DESCRIPTION OF THE EMBODIMENTS

Exemplary embodiments of the present disclosure will be described in detail below with reference to the accompanying drawings. Configurations described in the following exemplary embodiments are to be considered as illustrative, and the present disclosure is not limited to illustrated configurations.

Figure 1:
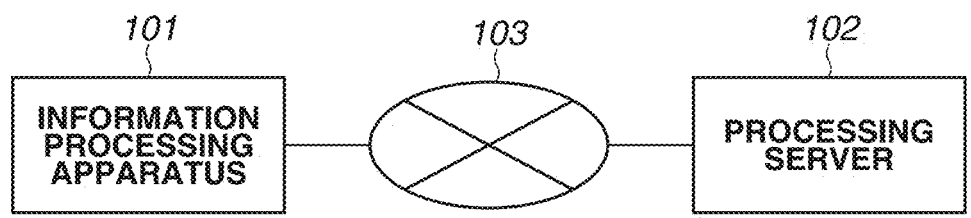
FIG. 1 is a block diagram illustrating an example of a system configuration of an information processing apparatus.

An example of a configuration of the information processing system according to a first exemplary embodiment will be described below with reference to FIG. 1.

The system according to the present exemplary embodiment includes an information processing apparatus 101 and a processing server 102.

These components are connected with each other via a network 103.

When the information processing apparatus 101 reads and recognizes a two-dimensional code, the information processing apparatus 101 transmits a processing request to the processing server 102. The information processing apparatus 101 is a user terminal operated by the user, such as a smart phone, tablet computer, or personal computer (PC).

Figure 2:
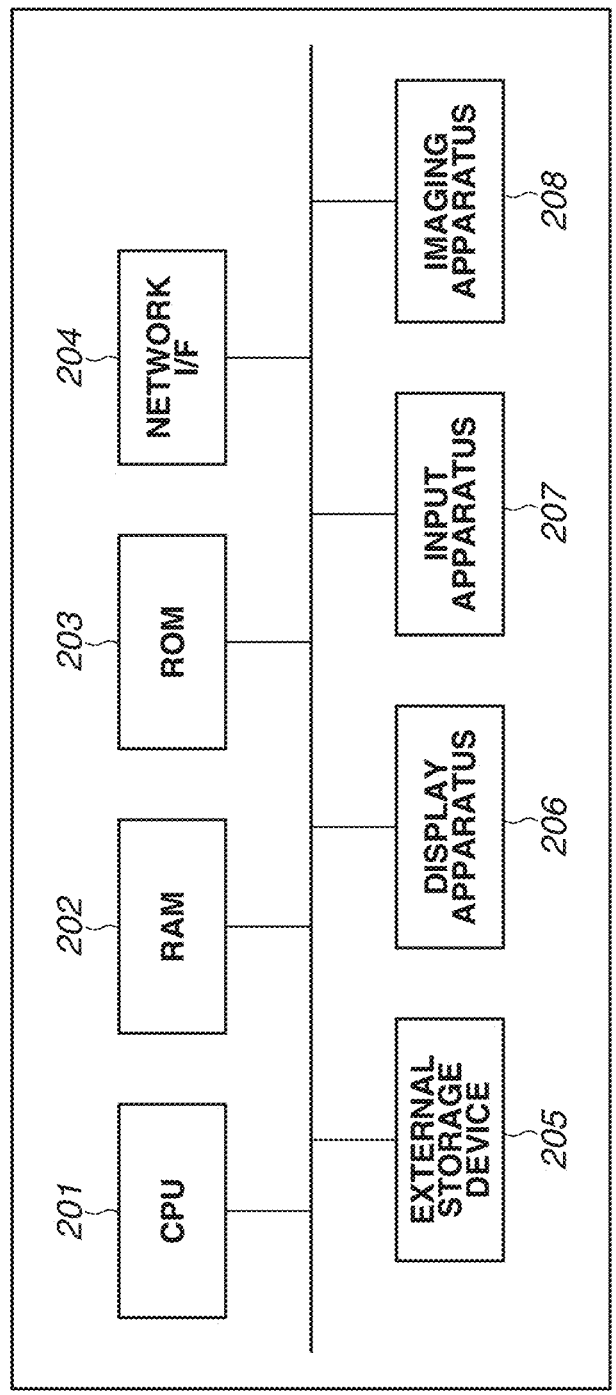
FIG. 2 is a block diagram illustrating an example of a hardware configuration of the information processing apparatus.

An example of a hardware configuration of the information processing apparatus 101 will be described below with reference to the block diagram in FIG. 2.

The information processing apparatus 101 includes at least a central processing unit (CPU) 201, a random access memory (RAM) 202, a read only memory (ROM) 203, a network interface 204, an external storage device 205, a display apparatus 206, an input apparatus 207, and an imaging apparatus 208.

The CPU 201 is the entity that performs operation control for each unit of the information processing apparatus 101 and performs various kinds of processing (described below) to be performed by the information processing apparatus 101.

The RAM 202 is a memory for temporarily storing data and control information and also serves as a work area used by the CPU 201 to perform various kinds of processing.

The ROM 203 stores fixed operation setting values and operation programs of the information processing apparatus 101.

The network interface 204 provides functions for connecting with the network 103 to perform communication. The network interface 204 enables the information processing apparatus 101 to transmit and receive data to/from an external apparatus.

The external storage device 205, an apparatus for storing data, includes an interface for receiving input/output (I/O) commands for reading and writing data. The external storage device 205 can be a hard disk drive (HDD), a solid state drive (SSD), a semiconductor storage device, or other storage devices. The external storage device 205 stores computer programs and data for enabling the CPU 201 to execute processing (described below) performed by the information processing apparatus 101.

The display apparatus 206 such as a liquid crystal display (LCD) displays information necessary for the user.

The input apparatus 207 including, for example, a keyboard, mouse, and touch panel receives necessary inputs from the user.

The information processing apparatus 101 acquires externally located two-dimensional code information by using the imaging apparatus 208. While two-dimensional codes include quick response (QR) Codes® and bar codes, other forms are also applicable. While the processing server 102 has a configuration similar to that of the processing apparatus 101, the processing server 102 does not need to have the imaging apparatus 208.

Figure 3:
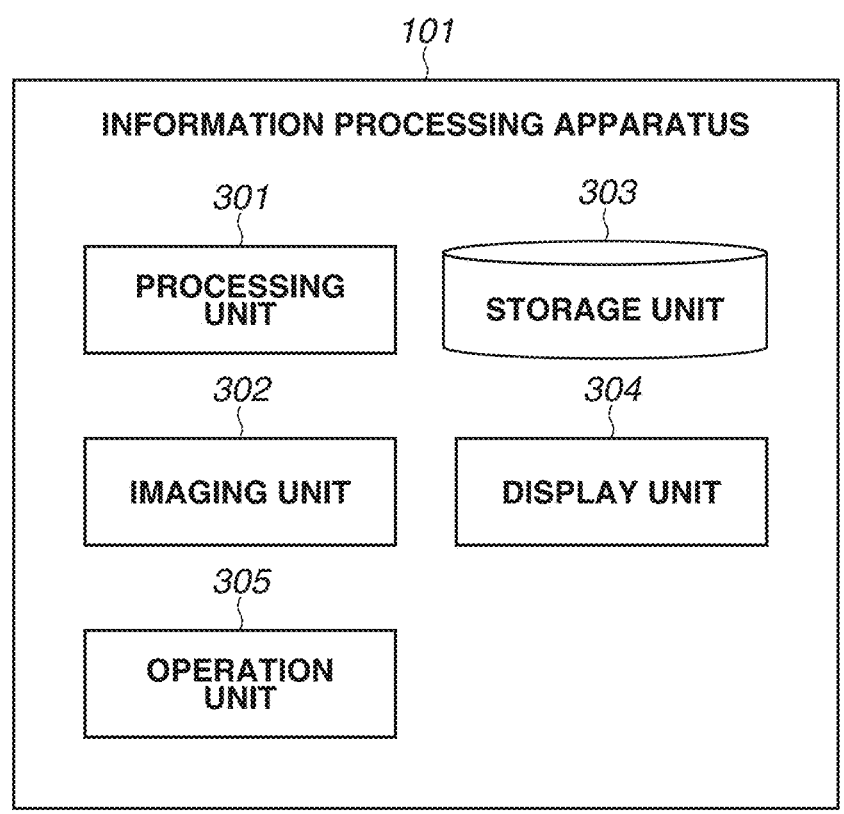
FIG. 3 is a block diagram illustrating an example of a functional configuration of the information processing apparatus.

FIG. 3 illustrates a functional configuration of the information processing apparatus 101. The information processing apparatus 101 includes a processing unit 301, an imaging unit 302, a storage unit 303, a display unit 304, and an operation unit 305.

The processing unit 301 performs various kinds of processing. The imaging unit 302 performs imaging processing such as processing for reading a two-dimensional code. The storage unit 303 stores various kinds of information. The display unit 304 performs screen display control. The operation unit 305 receives input operations from the user.

According to the present exemplary embodiment, the information processing apparatus 101 performs processing for a two-dimensional code satisfying a predetermined condition, but does not perform processing for a two-dimensional code that does not satisfy the predetermined condition. In the latter case, the information processing apparatus 101 provides a display to enable the user to recognize that the two-dimensional code is a non-processing target code. More specifically, even when a plurality of two-dimensional codes is captured, the information processing apparatus 101 is controlled to only perform processing corresponding to a two-dimensional code satisfying the condition.

Figure 4:
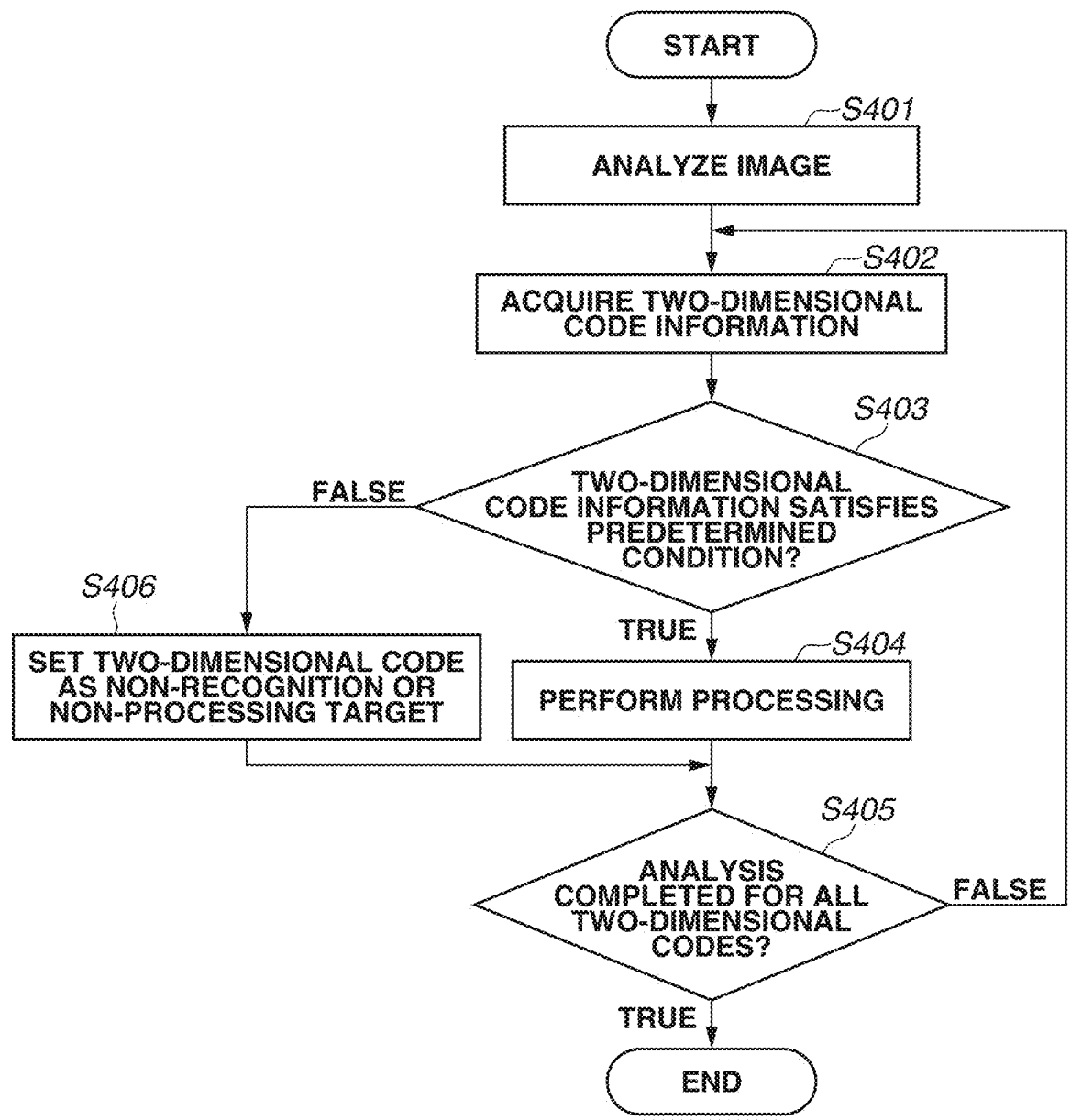
FIG. 4 is a flowchart illustrating an example of processing of the information processing apparatus.

Operations of the information processing apparatus 101 according to the present exemplary embodiment will be described below with reference to the flowchart in FIG. 4. Each step in the flowchart in FIG. 4 is implemented when the CPU 201 loads a control program stored in memory such as the ROM 203 into the RAM 202 and then executes the program. For example, this flowchart is started when the information processing apparatus 101 activates an application and then captures an image.

An image acquired by the imaging unit 302 is transmitted to the processing unit 301. In step S401, the processing unit 301 analyzes the received image. When the processing unit 301 recognizes a two-dimensional code in the received image, in step S402, the processing unit 301 acquires information included in the two-dimensional code. When a plurality of two-dimensional codes is included in the captured image, the processing unit 301 acquires information about one of the two-dimensional codes.

In step S403, the processing unit 301 determines whether the information acquired in step S402 satisfies a predetermined condition. For example, the information processing apparatus 101 pre-stores the identifier of the processing target two-dimensional code. When the identifier of the acquired two-dimensional code coincides with the identifier of the pre-stored two-dimensional code, the processing unit 301 determines that the predetermined condition is satisfied.

When the two-dimensional code includes Uniform Resource Locator (URL) information including a predetermined character string, the processing unit 301 also determines that the predetermined condition is satisfied. During execution of an application by the information processing apparatus 101, the processing unit 301 can determine that the predetermined condition is satisfied when the two-dimensional code corresponds to the application. For example, when the processing unit 301 activates a camera on a predetermined settlement service application and captures a two-dimensional code, the processing unit 301 determines that the predetermined condition is satisfied when the identifier of the predetermined settlement service is included in the two-dimensional code.

When the predetermined condition is determined to be satisfied (TRUE in step S403), the processing proceeds to step S404. In step S404, the processing unit 301 performs processing corresponding to the acquired two-dimensional code information. For example, the processing unit 301 performs settlement processing by transmitting the acquired two-dimensional code information to the processing server 102. Then, the processing proceeds to step S405.

When the processing unit 301 determines that the predetermined condition is not satisfied (FALSE in step S403), the processing proceeds to step S406. In step S406, the processing unit 301 sets the two-dimensional code corresponding to the information acquired in step S402 as a non-recognition or non-processing target code. Then, the display unit 304 changes the display to enable the user to recognize that the corresponding two-dimensional code is a non-recognition or non-processing target code. The processing then proceeds to step S405. The processing unit 301 does not process the two-dimensional code set as a non-recognition or non-processing target code.

In step S405, the processing unit 301 determines whether information is acquired from all of the two-dimensional codes included in the captured image. When information is acquired from all of the two-dimensional codes (TRUE in step S405), the processing ends. When information is not acquired from all of the two-dimensional codes (FALSE in step S405), the processing returns to step S402. the processing unit 301 then acquires information from the remaining two-dimensional codes and the above-described processing is repeated.

Figure 5:
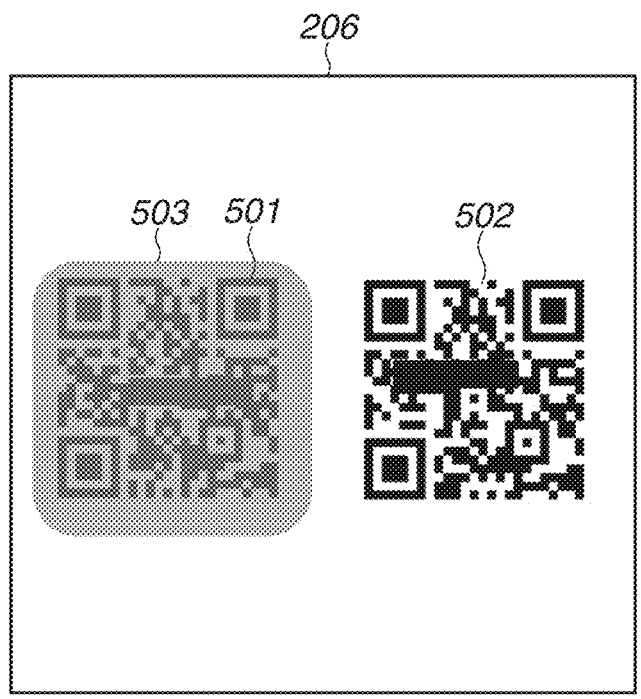
FIG. 5 illustrates an example of display when a non-recognition target region is set.

An example of display control in step S406 is illustrated in FIG. 5. This example illustrates a case where the information processing apparatus 101 captures two different two-dimensional codes and displays the codes on the display apparatus 206. A two-dimensional code 501 is an example of a non-processing target code, and a two-dimensional code 502 is an example of a processing target code. The processing unit 301 controls displaying display 503 that informs the user that the two-dimensional code 501 is a non-processing target code. While in the present exemplary embodiment, the processing unit 301 controls informing the user that the two-dimensional code 501 is a non-processing target code by graying out the two-dimensional code 501, this is not seen to be limiting. For example, the processing unit 301 can control displaying a message indicating that the two-dimensional code is a non-processing target code or a message prompting the user to read other two-dimensional codes. The processing unit 301 can control displaying the two-dimensional codes 501 and 502 in different display forms. If the processing unit 301 receives a predetermined operation for the two-dimensional code 501 as a non-processing target code from the user, the processing unit 301 can control hiding the display 503 and setting the two-dimensional code

501 as a processing target code. Examples of predetermined operations include double-tapping or long-depression. Upon receipt of a selection operation for the two-dimensional code 501 as a non-processing target code, the processing unit 301 can control displaying a pop-up prompting the user whether to perform processing. If the user confirms that processing is to be performed, the processing unit 301 performs processing.

In another exemplary embodiment, when a predetermined time has elapsed with the display 503 being displayed, the processing unit 301 can control hiding the display 503 and setting the two-dimensional code 501 as a processing target code.

Even if the information processing apparatus 101 captures a two-dimensional code unintended by the user via the above-described processing, the processing unit 301 only performs the processing corresponding to a two-dimensional code intended by the user.

The user can also grasp a non-processing target two-dimensional code.

A second exemplary embodiment will be described below with respect to a configuration where the user can preset a processing target two-dimensional code. The basic structure of the present exemplary embodiment is the same as that of the first exemplary embodiment.

Figure 6:
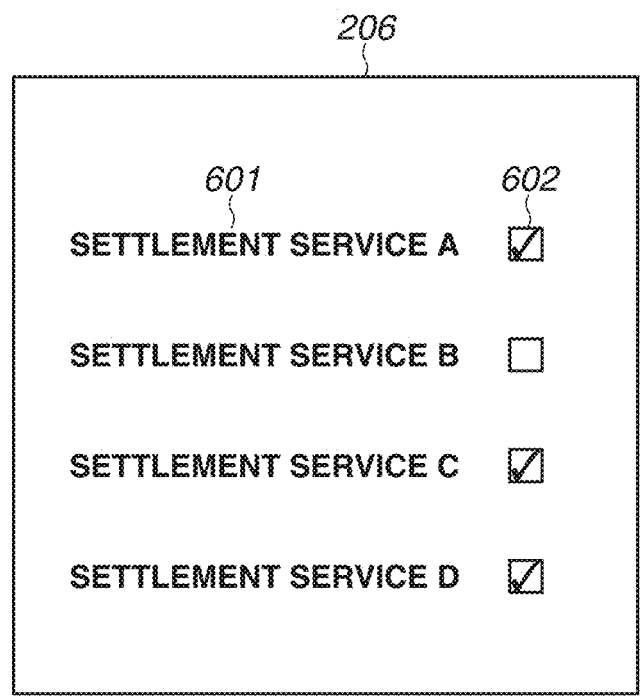
FIG. 6 illustrates an example of a user operation screen indicating a method for registering a processing target identifier.

FIG. 6 illustrates an example of an operation screen for registering a processing target two-dimensional code, i.e., a processing target service. The display apparatus 206 displays a name 601 of a service provided in association with the two-dimensional code, and a check box 602 for enabling the user to select a processing target service. The identifier for identifying the service selected by the check box 602 is stored in the storage unit 303 and then used for the determination in step S403. The processing corresponding to a two-dimensional code associated with the checked service will be performed by the information processing apparatus 101. The check box 602 can also be used by the user to cancel the processing target service.

The above-described configuration improves usability by enabling the user to pre-register a processing target service and to just use a preset service even when a plurality of two-dimensional codes is captured.

A third exemplary embodiment will be described below with respect to a configuration for determining whether to set a captured two-dimensional code as a processing target code based on services previously used by the user. The basic configuration of the present exemplary embodiment is the same as that of the first exemplary embodiment.

When processing unit 301 performs the processing corresponding to a two-dimensional code, the processing unit 301 stores the identifier of the processed service in the external storage device 205. When a new two-dimensional code is captured, the processing unit 301 determines whether the identifier of the service stored in the external storage device 205 coincides with the identifier of the acquired two-dimensional code in step S403.

When the processing unit 301 performs the processing corresponding to a two-dimensional code, the processing unit 301 can store the identifier of the service as well as the positional information in the external storage device 205. When a new two-dimensional code is captured, the processing unit 301 can also consider the positional information stored in the processing in step S403. For example, the processing unit 301 can determine that the predetermined condition is satisfied in step S403 if the same service has been used at the same shop.

The above-described configuration enables suitable service processing performance based on the past service use status of the user when a new two-dimensional code is captured.

According to the first exemplary embodiment, when the predetermined condition is determined to be satisfied in step S403 or when a predetermined operation is received from the user, the processing unit 301 performs the processing in step S404. According to a fourth exemplary embodiment, a captured two-dimensional code is set as a non-processing target code, i.e., manage an unused service in a black list. The basic configuration of the fourth exemplary embodiment is the same as that of the first exemplary embodiment.

FIG. 7 illustrates an example of an operation screen for registering a two-dimensional code or service not subjected to subsequent processing. The screen in FIG. 7 appears, for example, when the predetermined condition is determined to be satisfied in step S403, or when a predetermined operation for a two-dimensional code is received from the user. A message 701 indicates the processing target service, a button 702 is used to proceed with the processing, a button 703 is used to cancel the processing, and a button 704 is used to register a two-dimensional code as a non-processing target code in the subsequent processing. When the button 704 is selected, the identifier of the corresponding two-dimensional code or the identifier of the corresponding service is stored in the external storage device 205, and the corresponding service is not subsequently performed.

The above-described configuration provides improved security by enabling control to prevent use of a service determined to be dangerous by the user.

Any of the above-described exemplary embodiments can be combined with one or more of the other above-described exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2022-176783, filed Nov. 2, 2022, which is hereby incorporated by reference herein in its entirety.

What is claimed is:

1. An information processing apparatus comprising:
a memory storing instructions; and
a processor that, upon execution of the stored instructions, is configured to operate as:
an acquisition unit configured to read a two-dimensional code in a captured image to acquire information included in the readable two-dimensional code;
a control unit configured to, in a case where the information acquired from the readable two-dimensional code satisfies a predetermined condition, execute processing corresponding to the readable two-dimensional code; and
a display control unit configured to, in a case where the information acquired from the readable two-dimensional code does not satisfy the predetermined condition, display the readable two-dimensional code to enable a user to identify that the readable two-dimensional code is a non-processing target code.

2. The information processing apparatus according to claim 1, wherein the processor, upon execution of the stored instructions, is further configured to operate as: a setting unit configured to, in a case where the information acquired from the readable two-dimensional code does not satisfy the predetermined condition, set the readable two-dimensional code as a non-processing target code.

3. The information processing apparatus according to claim 2, wherein the control unit is further configured to not execute the processing corresponding to the readable two-dimensional code set as a non-processing target code.

4. The information processing apparatus according to claim 1, wherein the processor, upon execution of the stored instructions, is further configured to operate as: a determination unit configured to determine whether the predetermined condition is satisfied.

5. The information processing apparatus according to claim 4, wherein, in a case where an identifier of the readable two-dimensional code corresponds to an identifier stored in the information processing apparatus, the determination unit determines that the predetermined condition is satisfied.

6. The information processing apparatus according to claim 4, wherein, in a case where the readable two-dimensional code corresponds to a predetermined service, the determination unit determines that the predetermined condition is satisfied.

7. The information processing apparatus according to claim 6, wherein the processor, upon execution of the stored instructions, is further configured to operate as: a setting unit configured to enable the user to set the predetermined service.

8. The information processing apparatus according to claim 4, wherein the determination unit determines whether the predetermined condition is satisfied based on information indicating whether the processing corresponding to the readable two-dimensional code has been performed and positional information in a case where the processing has been performed.

9. The information processing apparatus according to claim 1, wherein the display control unit displays the readable two-dimensional code as is grayed out.

10. The information processing apparatus according to claim 1, wherein, upon receipt of a predetermined operation for the readable two-dimensional code, the processing corresponding to the readable two-dimensional code is performed.

11. The information processing apparatus according to claim 1, wherein when the readable two-dimensional code is displayed and a predetermined time elapses, the readable two-dimensional code is set as a processing target code.

12. A method executed by an information processing apparatus, the method comprising:
reading a two-dimensional code in a captured image to acquire information included in the readable two-dimensional code;
executing, in a case where the information acquired from the readable two-dimensional code satisfies a predetermined condition, processing corresponding to the readable two-dimensional code; and
displaying, in a case where the information acquired from the readable two-dimensional code does not satisfy the predetermined condition, the readable two-dimensional code to enable a user to identify that the readable two-dimensional code is a non-processing target code.

13. A non-transitory storage medium storing a program causing an information processing apparatus to execute a method, the method comprising:
reading a two-dimensional code in a captured image to acquire information included in the readable two-dimensional code;
executing, in a case where the information acquired from the readable two-dimensional code satisfies a predetermined condition, processing corresponding to the readable two-dimensional code; and
displaying, in a case where the information acquired from the readable two-dimensional code does not satisfy the predetermined condition, the readable two-dimensional code to enable a user to identify that the readable two-dimensional code is a non-processing target code.

* * * * *